United States Patent [19]

Vogelgesang

[11] Patent Number: 5,288,117
[45] Date of Patent: Feb. 22, 1994

[54] MOTOR VEHICLE BUMPER

[75] Inventor: Harald-Werner Vogelgesang, Wurmberg, Fed. Rep. of Germany

[73] Assignee: Dr. Ing. H.C.F. Porsche AG, Weissach, Fed. Rep. of Germany

[21] Appl. No.: 991,343

[22] Filed: Dec. 15, 1992

[30] Foreign Application Priority Data

Dec. 21, 1991 [DE] Fed. Rep. of Germany ....... 4142582

[51] Int. Cl.⁵ ............................................. B60R 19/08
[52] U.S. Cl. ..................................... 293/117; 293/120; 362/82
[58] Field of Search .................. 293/117, 120, 132; 362/82

[56] References Cited

U.S. PATENT DOCUMENTS

| | | | |
|---|---|---|---|
| 3,583,756 | 6/1971 | Wilfert | 293/117 |
| 4,070,051 | 1/1978 | Peter | 293/117 |
| 4,213,644 | 7/1980 | Scrivo et al. | 293/117 |

Primary Examiner—Robert R. Song
Attorney, Agent, or Firm—Evenson, McKeown, Edwards & Lenahan

[57] ABSTRACT

A bumper for motor vehicles, comprises a dimensionally stable supporting bracket and an elastic covering which forms the front end area of the vehicle body and on which at least bone lamp compartment is constructed for receiving a lamp compartment. In order to, when the lamp compartment is arranged on the edge side on the covering, on the one hand, achieve a fastening of the covering that is appropriate for its functioning and, on the other hand, ensure a no-damage backward escaping of the lamp unit after the effect of force as well as a subsequent returning into the original position, the lamp compartment rests, at least in sections, on a supporting element which is constructed in a sword shape and is disposed to carry out relative movements.

14 Claims, 8 Drawing Sheets

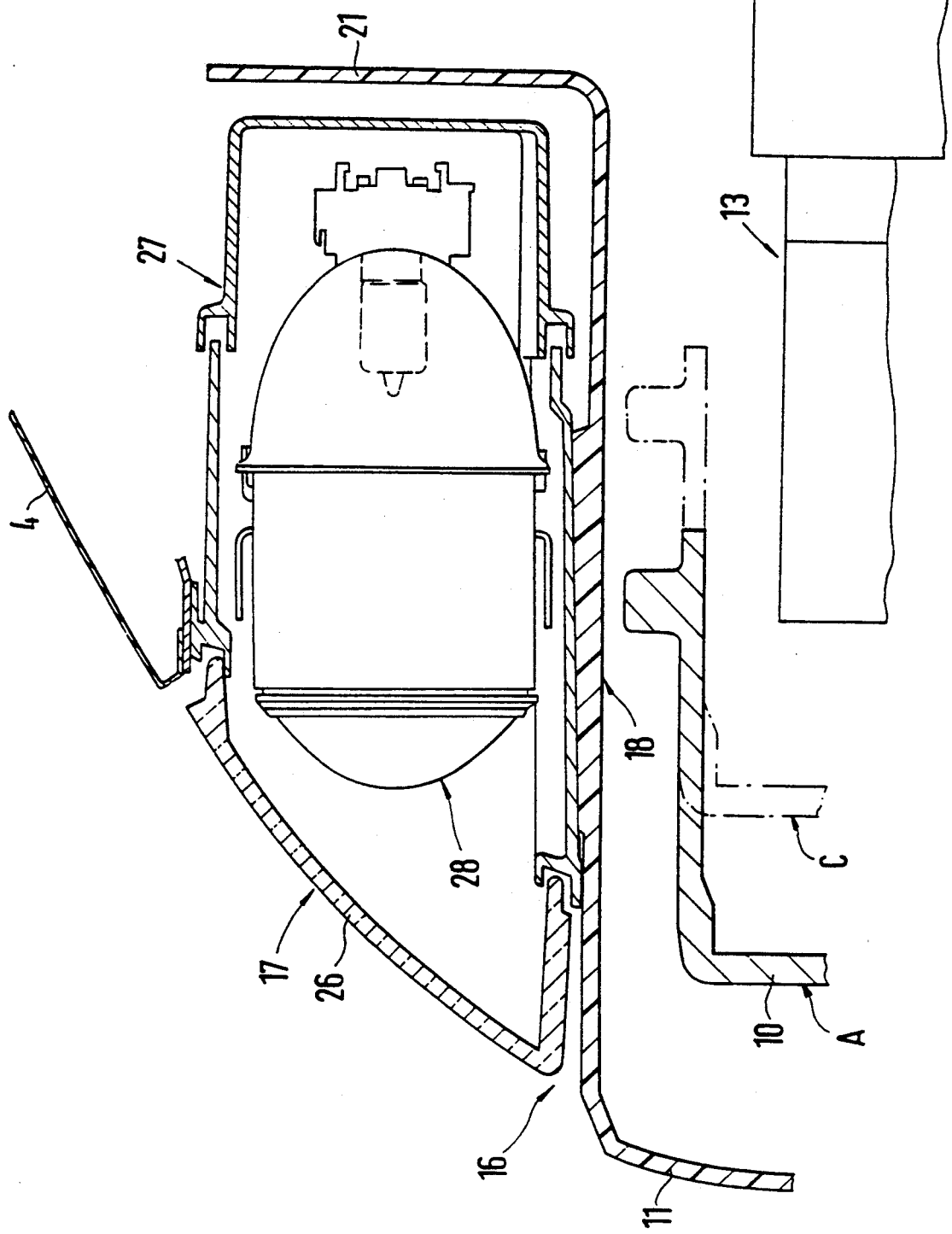

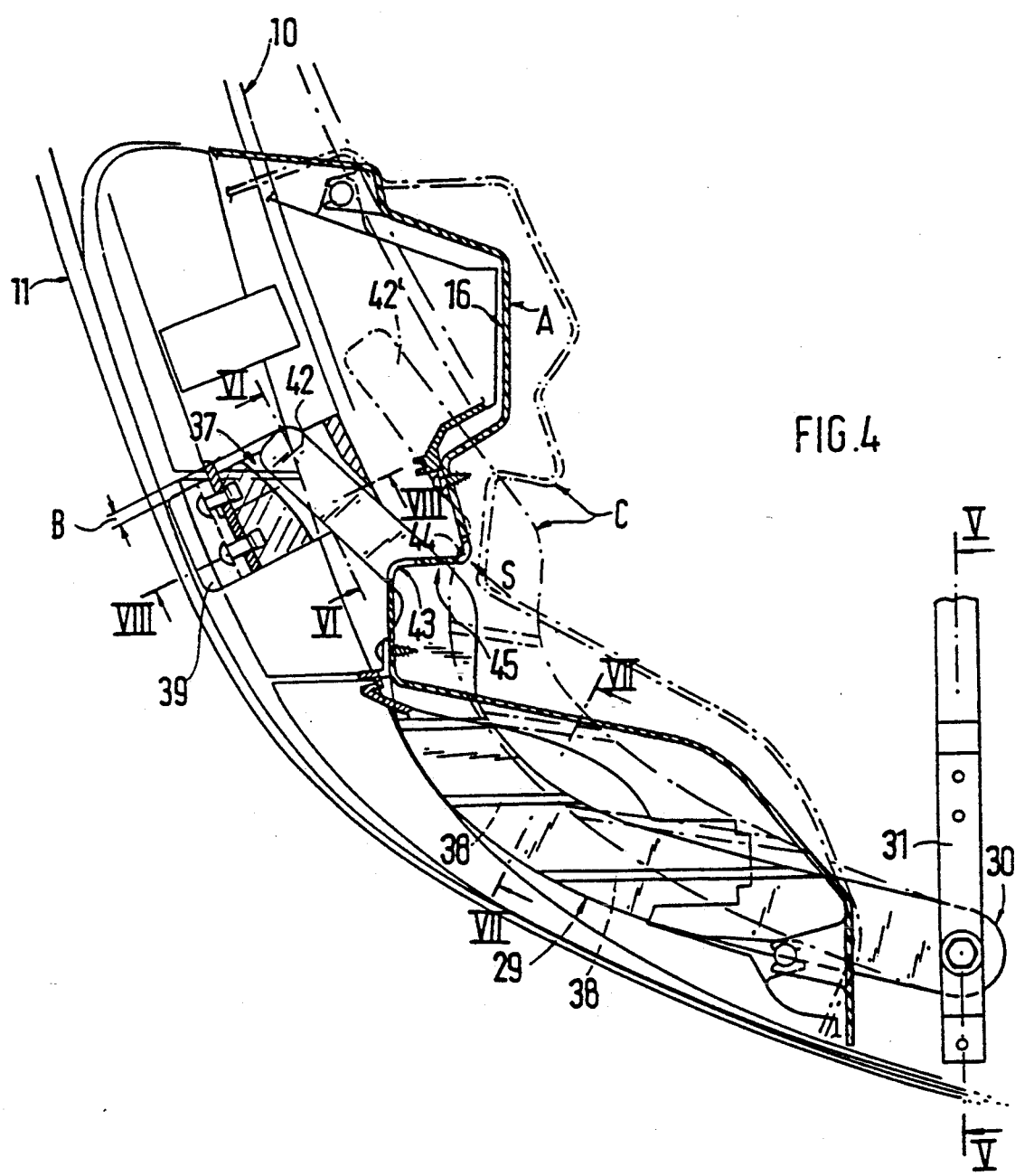

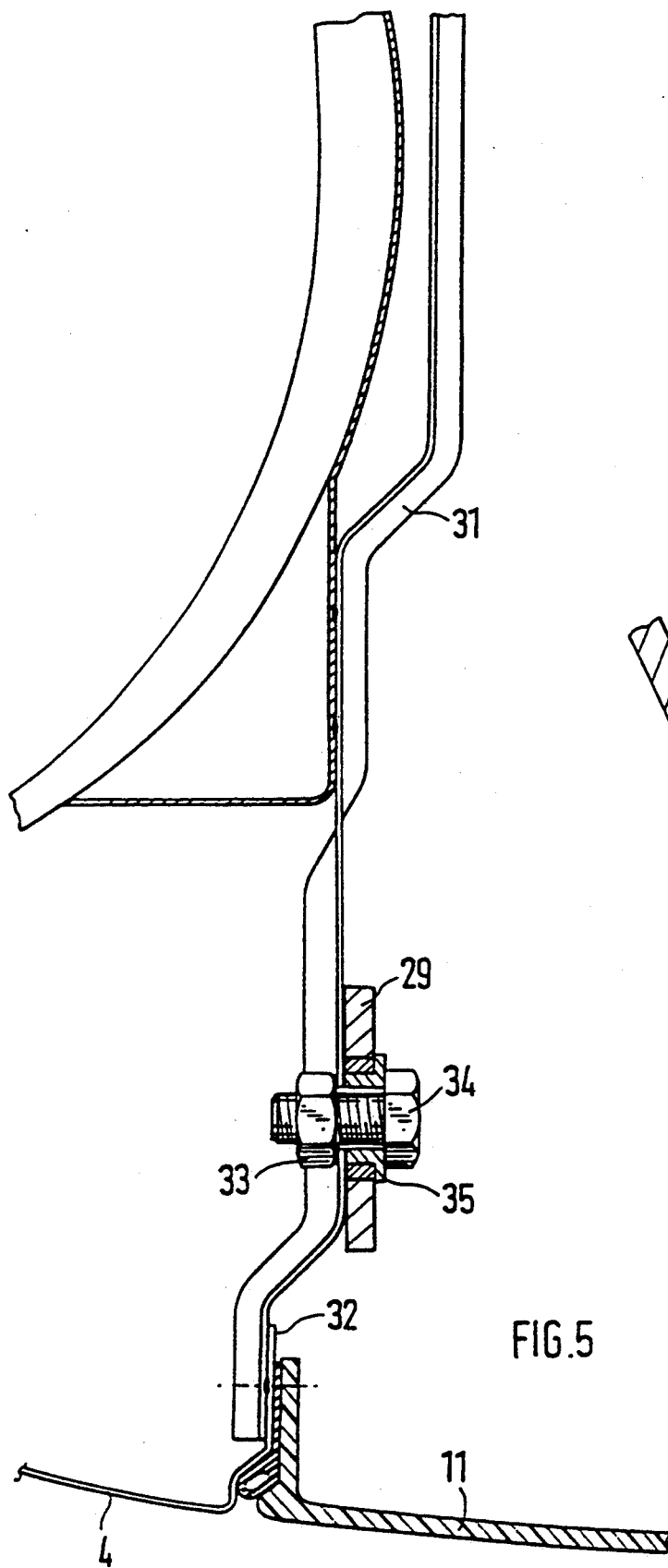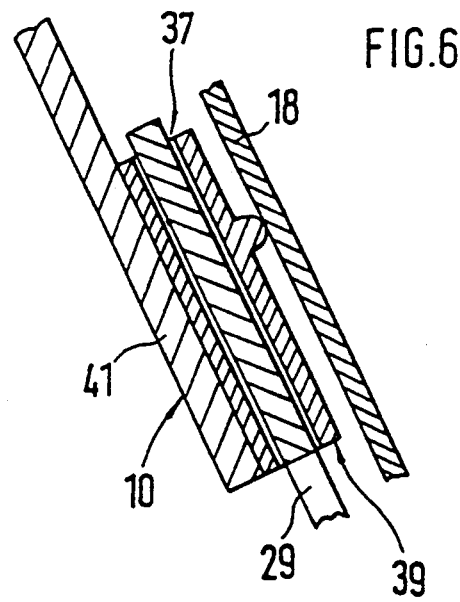

MOTOR VEHICLE BUMPER

BACKGROUND AND SUMMARY OF THE INVENTION

The present invention relates to a bumper for vehicles, and, more particularly, to a bumper for motor vehicles, comprising a dimensionally stable supporting bracket and an elastic covering forming a front end area of a body of the motor vehicle and on which at least one lamp compartment is constructed for receiving a lamp unit.

In the case of a known vehicle such as the Porsche 911 Carrera 2 and 4, a bumper is provided in the forward area which comprises a dimensionally stable supporting bracket and an elastic covering forming the front end area of the vehicle. One lamp compartment respectively for accommodating a lamp unit is provided on the large-surface covering on both sides of a license plate. The two lamp compartments are provided in a center area of the covering so that an upper edge of the covering can be continuously fastened to the adjacent vehicle body.

When the lamp compartment is arranged on the edge side or the lamp unit is fastened to the covering, it is an object of the present invention to take such measures that, on the one hand, the covering is fastened in this area in a manner that is appropriate for its functioning (no sagging) and that, on the other hand, in the case of an pendulum impact of 30°, the lamp unit can yield backwards without being damaged and, after being acted upon by the impact, can return to its original position.

This object has been achieved according to the invention by providing that wherein at least one lamp compartment arranged on an edge side of the covering rests, t least in sections, on a supporting element having a sword-shaped configuration and operatively arranged to carry out relative movements.

Principal advantages achieved with the invention are that, as a result of the arrangement of a sword-shaped supporting element which is disposed so that it can carry out relative movements below the lamp compartment constructed on the side of the edge on the covering, on the one hand, a sagging of the covering is avoided and that, on the other hand, in the case of a 30° pendulum impact, the lamp unit can escape toward the rear without any damage and can, after it has been acted upon by the impact, return into its original position. On one of its ends, the supporting element is rotatably arranged on a wheel-housing-side holder, whereas the other end of the supporting element is slidably held in position on a receiving device of the dimensionally stable supporting bracket. The receiving device is constructed on the end side on the dimensionally stable supporting bracket.

Recesses which are provided on the lamp compartment between the two lamps to be received, cause a predetermined bending point of the lamp compartment when it is acted upon by an impact and absorb the change of length of the lamp compartment during the deformation. The supporting element is arched upwards in order to generate a prestressing for the covering.

BRIEF DESCRIPTION OF THE DRAWINGS

These and other objects, features and advantages of the present invention will become more readily apparent from the following detailed description of a currently preferred embodiment when taken in conjunction with the accompanying drawings wherein:

FIG. 3 is an enlarged sectional view along line III-—III of FIG. 2;

FIG. 4 is a partial sectional top view of the lamp compartment of the covering, the dimensionally stable supporting bracket and the supporting element;

FIG. 5 is an enlarged sectional view along line V—V of FIG. 4;

FIG. 6 is an enlarged sectional view along line VI—VI of FIG. 4;

DETAILED DESCRIPTION OF THE DRAWINGS

Figure 1:
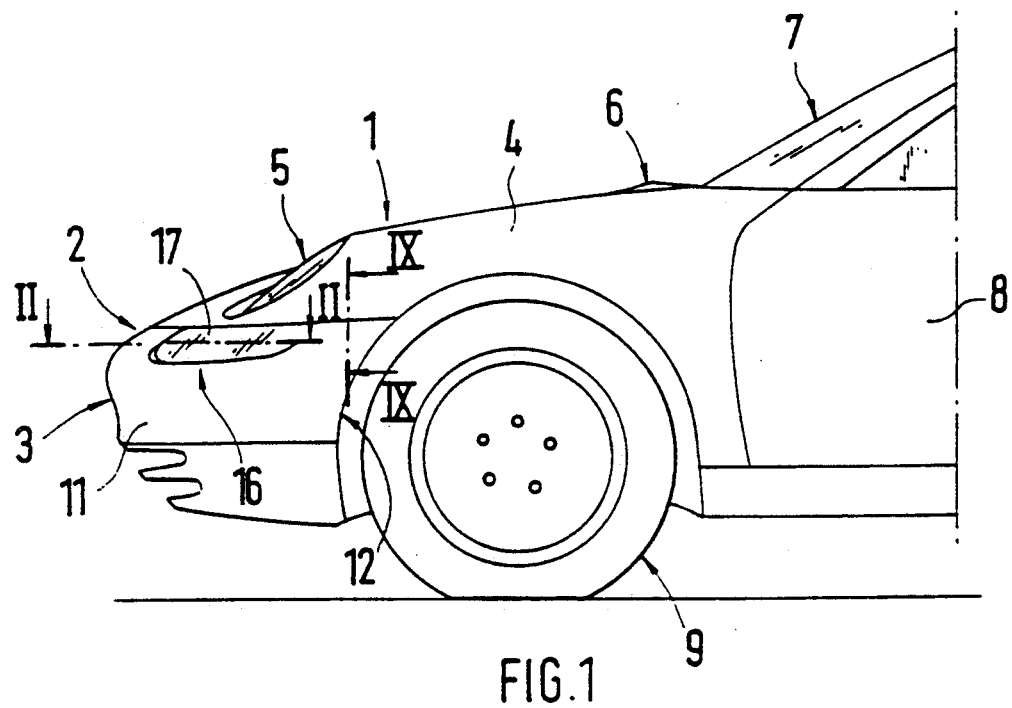
FIG. 1 is a partial side view of a forward area of a passenger car having a bumper.
Figure 2:
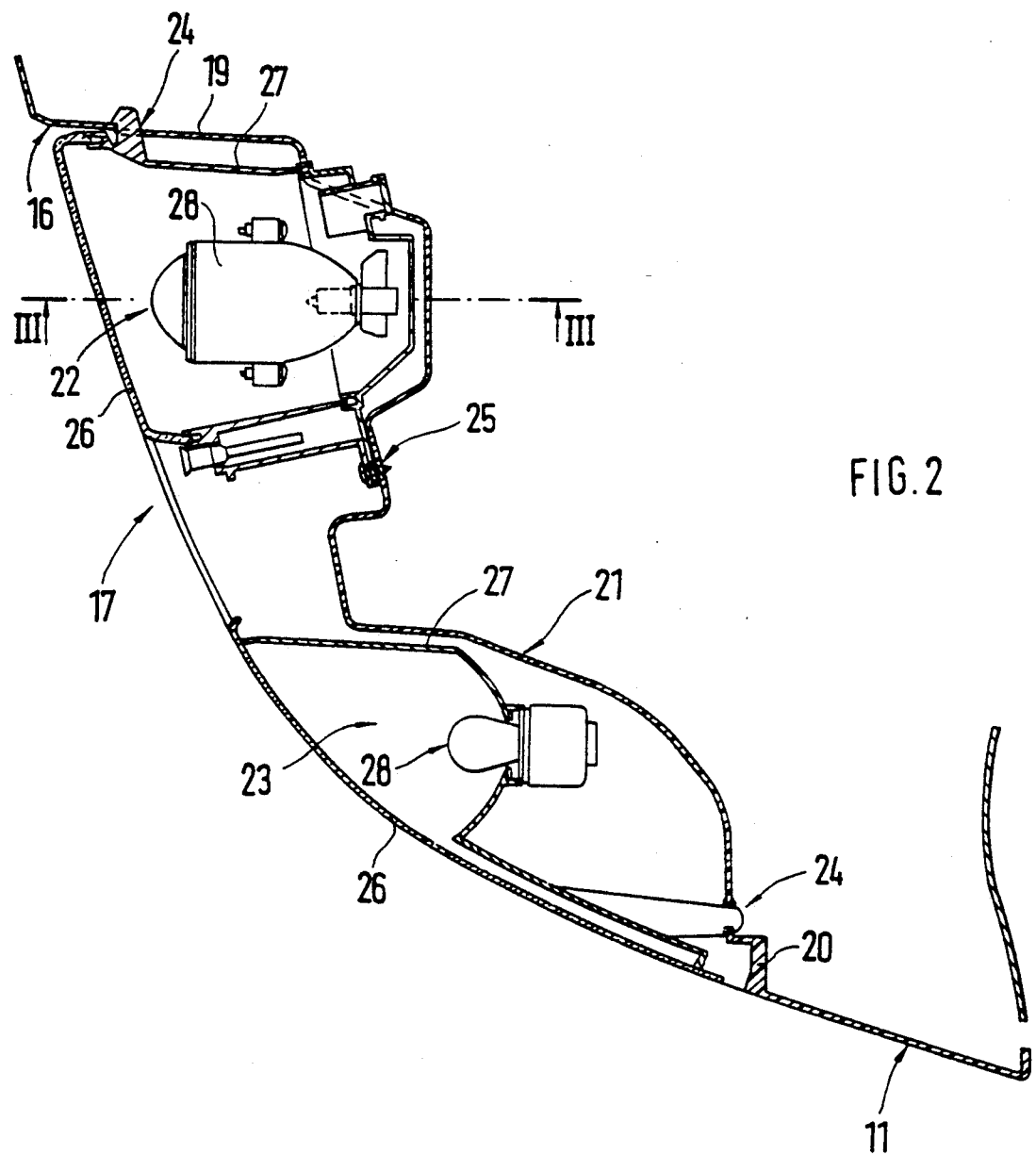
FIG. 2 is an enlarged sectional view along line II—II of FIG. 1.
Figure 7:
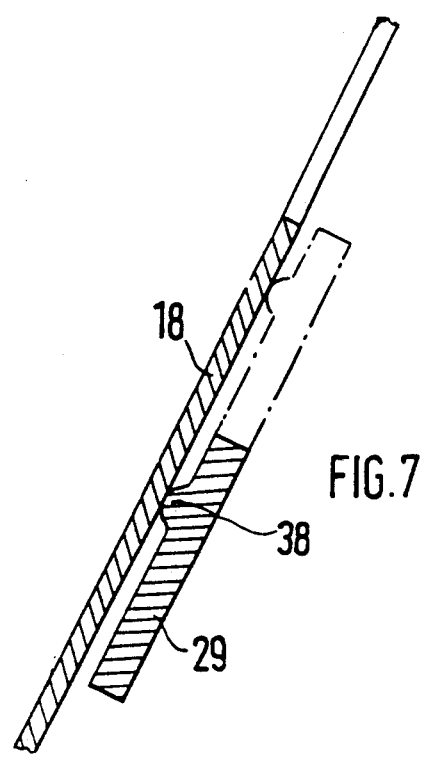
FIG. 7 is an enlarged sectional view along line VII—VII of FIG. 4.

FIG. 1 illustrates a forward area of a passenger car 1 comprising a body 2 composed of a bumper 3, a forward side part 4, a headlight 5, a forward hood 6, a windshield 7, a door 8 and front wheels 9. The bumper 3 has a dimensionally stable supporting bracket 10 (FIG. 3) and an elastic covering 11 which forms the end area of the vehicle body is disposed in front of the supporting bracket 10 and extends laterally around to an adjacent wheel house 12 of the front wheels 9.

Figure 10:
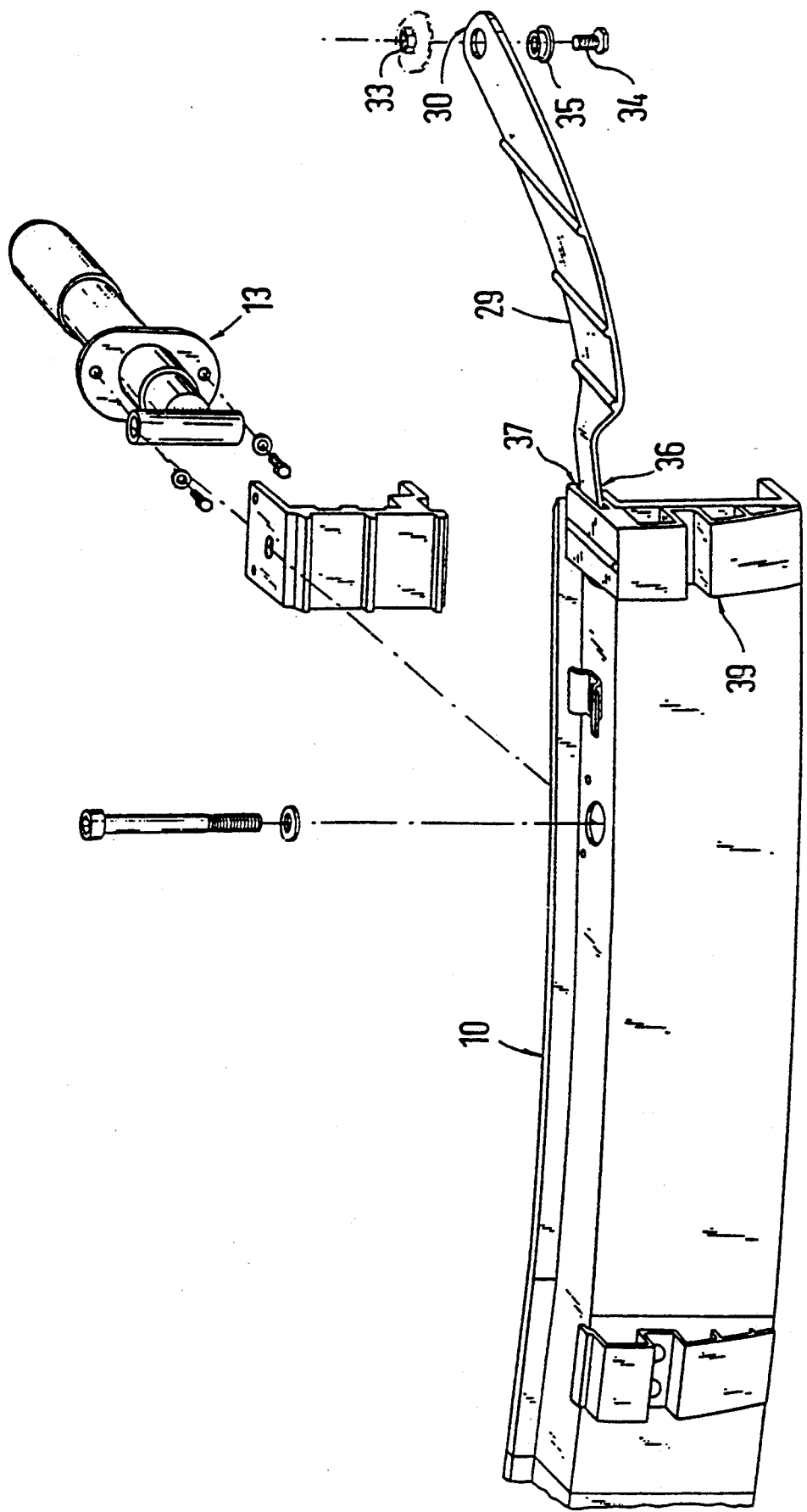
FIG. 10 is a perspective view from the front of the dimensionally stable supporting bracket and the supporting element.

As seen in FIG. 10, the approximately U-shaped dimensionally stable supporting bracket 10, which can, for example, be formed by an extruded profile which is made of light metal (e.g., aluminum), is bent as viewed in top view, and is supported by impact absorbing devices 13 on side members of the vehicle body 2 (not shown in detail).

Figure 9:
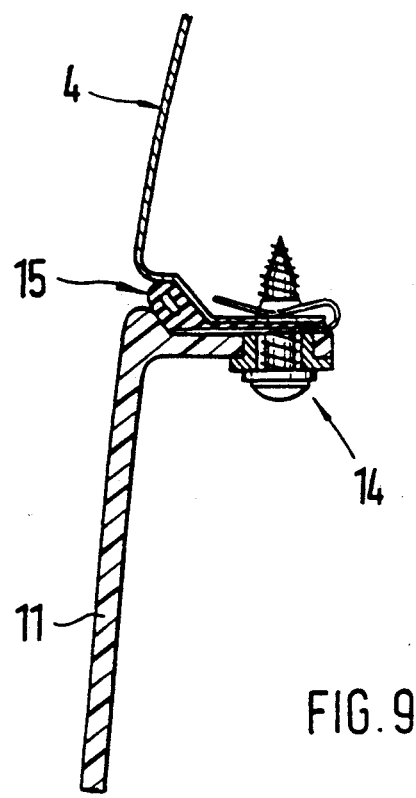
FIG. 9, is an enlarged sectional view along line IX—IX of FIG. 1.

FIG. 9 shows how the elastic covering 11 is held in position at several locations by conventional fastening elements 14 on a stationary body part (such as the side part 4) disposed there above. A sealing strip 15 is provided between the vehicle body part and the bent-away upper edge area of the covering 11. In addition, recess-shaped lamp compartments 16 are arranged on the elastic covering 11, in the area below the headlights 5. Lamp units 17 are fitted into these lamp compartments 16 as seen in FIG. 1. The recess-shaped lamp compartments 16 are constructed on the edge side of the covering 11. Each lamp compartment 16 is formed by a lower, approximately horizontally aligned wall 18, by two lateral wall sections 19, 20 extending from the covering 11 toward the interior, and by a rear, upright boundary wall 21. The two lateral wall sections 19, 20 lead in one piece into the rear boundary wall 21, in Which case the rear boundary wall 21 has a shape which is adapted to the inserted lamps. Because of the edge-side arrangement of the lamp compartment 16, an upper boundary wall is not provided.

Each lamp unit 17 comprises a fog lamp 22 and a turn signal lamp 23 which are inserted side-by-side in the lamp compartments 16. The fog lamp 22 as well as the turn signal lamp 23 are firmly connected with the lamp compartment 16 by way of a plug-type connection 24 and/or a screwed connection 25. As shown in FIG. 3, the fog lamp 22 comprises a lens 26 and a two-piece housing 27 which accommodates a source of illumination 28. The turn signal lamp 23 has a generally similar construction to that of the fog lamp 22.

In order to avoid a sagging of the elastic covering 11 in the area of the lamp compartment 16, which has a relatively large transverse dimension and is arranged on the edge side, and in order to ensure an escape toward the rear and a subsequent return of the lamp unit 17 in the case of a 30° pendulum impact, the lamp compartment 16, which is constructed on the edge side, rests, at least in sections, on a sword-shaped supporting element 29, which is supported so that it can carry out relative movements as best seen in FIG. 4.

On one of its ends 30, the approximately horizontally aligned sword-shaped supporting element 29 is rotatably connected with a wheel-housing-side holder 31.

The wheel-housing-side holder 31 extends in a transverse direction of the vehicle and is fixedly connected (for example, welded together) on one side with the wheel housing 12 and on the other side with an inwardly bent flange 32 of the side part 4. On the approximately U-shaped profiled holder 31, a weld nut 33 is locally arranged into which a fastening screw 34 is screwed for the supporting element 29 as illustrated in FIG. 5. In addition, one or several bushings 35 are provided for the rotatable bearing of the supporting element 29 which surround the fastening screw 34 and are inserted into an opening of the supporting element 29 as seen in FIG. 4. The other end 36 of the supporting element 29 is slidably held in position in a receiving device 37 of the dimensionally stable supporting bracket 10 such that the supporting element 29 is fixed in the vertical direction but a swivel movement of the supporting element 29 is possible inside the receiving device 37 with reference to FIG. 10. The supporting element 29 extends below the approximately horizontally aligned lower wall 18 of the lamp compartment 16. Projecting ribs 38 on the supporting element 29 are constructed locally to extend in the longitudinal direction and the lamp compartment 16 rests thereon in a linear manner. The ribs 38 are spaced from and parallel to one another.

Figure 8:
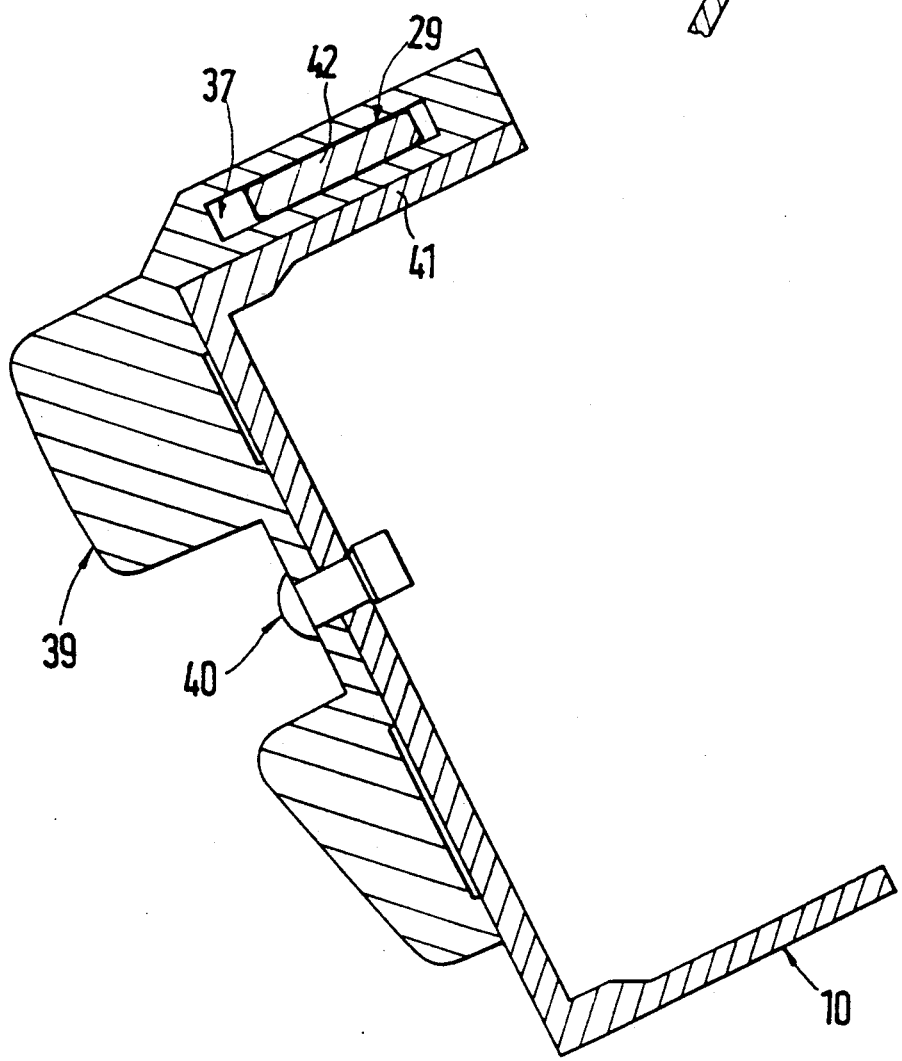
FIG. 8 is an enlarged sectional view along line VIII—VIII of FIG. 4.

As seen in to FIGS. 8 and 10, the slot-shaped receiving device 37 is provided on an bumper guard 39 made of aluminum or plastic which is fitted onto the dimensionally stable supporting bracket 10 on the end side. The bumper guard is connected with the supporting bracket 10 disposed behind it by a rivet 40. The receiving device 37 extends above a horizontally aligned upper leg 41 of the dimensionally stable supporting bracket 10 and is dimensioned in the vertical direction such that a non-rattling snug fit exists between the receiving device 37 and the supporting element 29.

In top view, the receiving device 37 has a significantly larger width than a narrow, long-stretched end area 42 of the supporting element 29 since under the influence of force the dimensionally stable supporting bracket 10 and the supporting element 29 carry out a relative movement and the length change of the supporting element 29 must be absorbed in the receiving device 37. In the installed position A (FIGS. 3 and 4), the end area 42 of the supporting element 29 projects only slightly (distance B on FIG. 4) beyond the receiving device 37, whereas after being acted upon by an impact (position C), the end area 42 projects beyond the receiving device 37 by a measurement that is larger than distance B. Viewed in the transverse direction, the dimensionally stable supporting bracket 10 ends approximately in the outer edge area of the fog lamp 22.

Figure 11:
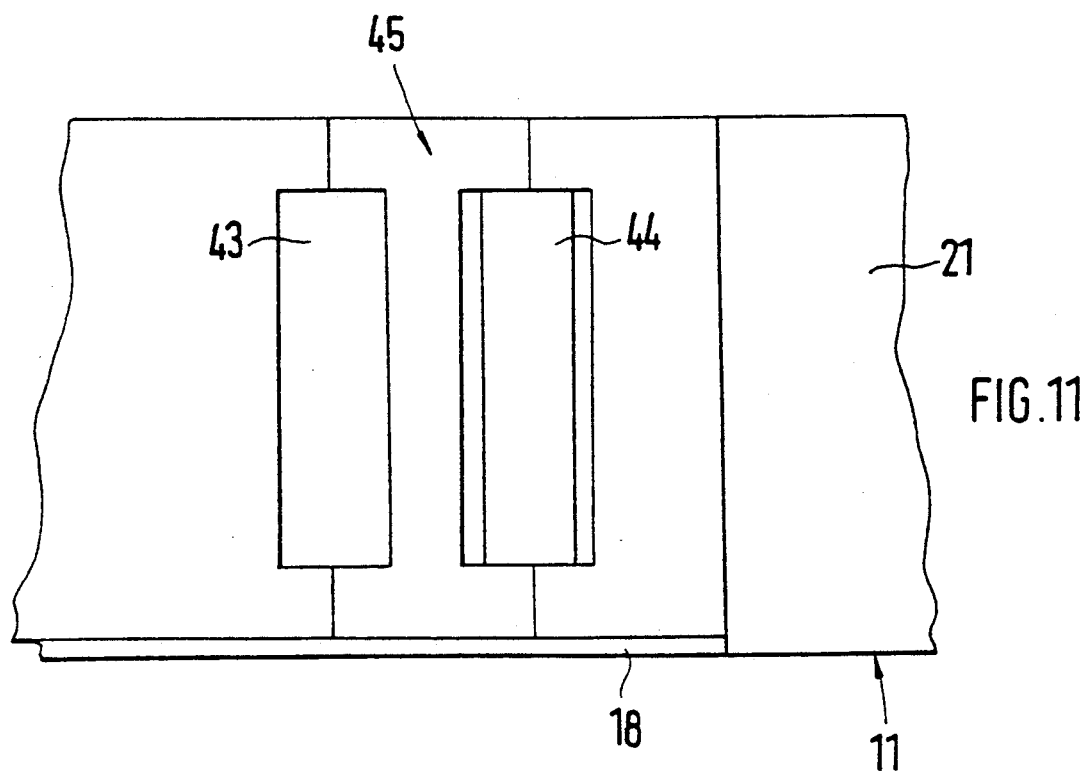
FIG. 11 is a view in the direction of the arrow S of FIG. 4.

In the area between the two lamps 22, 23 of the lamp unit 17, upright extending recesses 43, 44 (FIG. 11) are provided on the rear boundary wall 21 of the lamp compartment 16 in the area of a Z-shaped fold 45 which define a predetermined bending point for the lamp compartment 16 when acted upon by force and absorb the change of length in a defined manner (FIG. 4). After being acted upon by an impact, the covering 11 with the lamp units 17 and the supporting element 29 are returned into their original position (installed position A) by the restoring force of the impact absorbing devices 13.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A bumper for a motor vehicle, comprising a dimensionally stable supporting bracket and an elastic covering forming a front end area of a body of the motor vehicle and on which at least one lamp compartment, formed on an upper edge side of the covering, is constructed for receiving a lamp unit, wherein the at least one lamp compartment rests, at least in sections, on a supporting element having a sword-shaped configuration which in cooperation with the supporting bracket and the body of the motor vehicle, is operatively arranged to carry out relative movements.

2. The bumper according to claim 1, wherein the supporting element extends below an approximately horizontally aligned lower wall of the at lease one lamp compartment.

3. The bumper according to claim 1, wherein on a side of the supporting element facing the at least one lamp compartment, local projecting ribs extend in a longitudinal direction of the motor vehicle such that the lamp compartment rest thereon.

4. The bumper according to claim 3, wherein the supporting element extends below an approximately horizontally aligned lower wall of the at lease one lamp compartment.

5. The bumper according to claim 2, wherein that the supporting element is arched upwards in the direction of the at least one lamp compartment.

6. The bumper according to claim 5, wherein the supporting element extends below an approximately horizontally aligned lower wall of the at lease one lamp compartment.

7. The bumper according to claim 6, wherein on a side of the supporting element facing the at least one lamp compartment, local projecting ribs extend in a longitudinal direction of the motor vehicle such that the lamp compartment rest thereon.

8. The bumper according to claim 1, wherein one end of the supporting element, is rotatably disposed on a wheel-housing side holder.

9. The bumper according to claim 8, wherein end, of the supporting element engages in a receiving device of the dimensionally stable supporting bracket and is operatively held in position there at so that it can be slid in a predetermined manner, and the supporting element, as viewed in a vertical direction, being fixed in the receiving device.

10. The bumper according to claim 9, where the receiving device is slot-shaped and is arranged on a bumper guard provided on the one end side on the dimensionally stable supporting bracket.

11. The bumper according to claim 10, wherein the receiving device is operatively arranged onto an upper, approximately horizontally aligned leg of the dimensionally stable supporting bracket.

12. The bumper according to claim 9, wherein as viewed in the top view, the receiving device is in configured such that a swivel movement of the supporting element is positively ensured when the bumper is impacted and at least one of the supporting element and the bumper carries out a restoring movement.

13. The bumper according to claim 1, wherein impact absorbers are operatively associated with the supporting element such that after being acted upon by an impact, the supporting element is configured and arranged such that, as a result of the supporting force of the impact absorbers, is returned to its original position.

14. The bumper according to claim 1, wherein recesses are provided on a rearward upright boundary wall of the at least one lamp compartment in the area of a Z-shaped fold, so as to absorb changes of length of the at least one lamp compartment when pressure sets on the bumper.

* * * * *